Patented Jan. 26, 1926.

1,571,048

UNITED STATES PATENT OFFICE.

JAMES RANKIN GARROW, OF LONDON, ENGLAND, ASSIGNOR, BY MESNE ASSIGNMENTS, TO NOVOCRETE & CEMENT PRODUCTS COMPANY LIMITED, OF LONDON, ENGLAND, A CORPORATION OF GREAT BRITAIN.

TREATMENT OF FIBROUS MATERIALS.

No Drawing. Application filed August 28, 1924. Serial No. 734,816.

*To all whom it may concern:*

Be it known that I, JAMES RANKIN GARROW, a subject of the King of Great Britain, residing at London, England, have invented certain new and useful Improvements Relating to the Treatment of Fibrous Materials, of which the following is a specification.

This invention relates to the treatment of fibrous materials.

According to the present invention fibrous material is mineralized by impregnating the material with a solution of a metallic salt, that is, a solution which is of such a degree of alkalinity that the minimum amount of alkali only need be added to produce the precipitation of a mineral compound, and then precipitating the mineral compound from the solution in and on the material, for instance, by bringing the impregnated material into contact with an element, for instance, alkali or alkaline earth, so that a permanent precipitate of mineral compound takes place in and on the material.

As the reaction takes place inside the fibrous material as well as outside, the pores of the saturated material are filled, with the result that the material is mineralized or petrified.

This invention is particularly applicable to the treatment of sawdust, but the invention is not limited to this use, as much materials as ground peat, wood pulp, coir refuse, ground cork, and the like, can also be mineralized or petrified as above set forth.

In the description now following sawdust is referred to by way of example as the fibrous material to be treated.

In one method of carrying out the present invention a solution of a normal iron salt is used, such as ferric chloride or iron perchloride, which is rendered sensitive in respect to the tendency it possesses for a mineral compound to precipitate therefrom, by means of the addition of an alkali or alkaline salt, such as oxide or hydrate, or carbonate or bicarbonate of sodium, potassium, or any of the alkali earths, such as of calcium, the amount added being such that a slight excess of that amount would provide a permanent precipitate. The process, however, would not be injured if a permanent precipitate is formed in the liquor to a very small extent. When using a solution from iron perchloride a suitable proportion is one pound of the chloride in every ten pounds of water with the necessary amount of alkali to render the solution sensitive as set forth; about two ounces of caustic soda or about four ounces of carbonate is usually found sufficient; the exact proportion depends on the purity of the iron perchloride. The sawdust is then impregnated with the solution previous to being mixed with the chosen element which is to produce precipitation of the mineral compound, with the result that iron is precipitated as a hydrated oxide, a carbonate, or in other insoluble form, partly in and on the sawdust particles.

Sawdust so treated retains its granular form and is found to be suitable as in insulating medium, and the treated material may be shaped and pressed into blocks to form bricks, or other required shape may be given to the material by a suitable working.

However, another important application of the process above stated is its use in forming compositions of fibrous materials, including cement.

In manufacturing such compositions according to the present invention the fibrous material is impregnated with a sensitive solution as set forth of a metallic salt, and a mineral compound precipitated in and on the sawdust. The mineralized sawdust is then mixed with the cement which enables it to firmly adhere to the mineralized surface of the sawdust particles.

Various metallic salts may be prepared and used in the way before described for treating fibrous materials, for instance, salts of aluminium, chromium, and the like, or mixtures thereof. However, when it is intended to use the invention as a means of mixing sawdust and cements it is necessary to select the salt so that the by-products formed by the reaction are not deleterious to the cement employed.

It should be clear from the foregoing that the present invention is applicable not only to fibrous materials in granular form but also to such materials in slabs, or the like, particularly also for the treatment of reinforcing wood rods, or stays, used in strengthening concrete.

In the manufacture of cement composition above mentioned, sand or other filling material in certain cases may be included, and it should be understood that the term "cement" used herein includes not only the specific cements mentioned and a mixture of cement and sand, but also concrete, lime and sand, and the like.

An application of the invention is in the employment of mineralized sawdust, either with or without cement as a fireproof composition.

I am aware that it has heretofore been proposed to saturate vegetable fibers with a solution of ferrous sulphate or chloride and then to mix the saturated fibers with a reagent to effect the decomposition of the ferrous salt, this process being used in the preparation of a filter for the desulphurization of a gas containing sulphuretted hydrogen, the iron charged material being exposed to atmosphere or otherwise oxygenated before being used in the filter bed. The iron charged material is not mineralized as in the present invention, but of course would be mineralized to a certain extent. However, it should be noted that to produce a product as produced by the process of the present invention this known process would have to be repeated a number of times in order to obtain the required percentage of hydrated iron in the sawdust to make it mineralized to the extent obtained by the present invention, and it is to be noted that no claim is made to the mere use of a solution of a normal salt as the saturating solution, which as above pointed out is not suitable for processes according to the present invention.

I claim:—

1. A process of treating fibrous materials which consists in impregnating the said materials with a solution of a metallic salt, which is of such a degree of alkalinity that the minimum amount of alkali only need be added to produce the precipitation of a mineral compound, and precipitating a mineral compound from the solution in and on the material.

2. A process of treating fibrous materials, which consists in impregnating the said material with a solution of a metallic salt which is of such a degree of alkalinity that the minimum amount of alkali only need be added to produce the precipitation of a mineral compound, and then bringing the impregnated material in contact with a reagent to precipitate the mineral compound, which precipitation takes place in and on the material, thereby closing the pores of the said material.

3. Process of treating fibrous material which consists in impregnating the material with a solution of a metallic chloride which is of such a degree of alkalinity that the minimum amount of alkali only need be added to produce the precipitation of a mineral compound, and then bringing the impregnated material into contact with an alkaline substance to precipitate the mineral compound in and on the material.

4. A process of treating fibrous materials which consists in impregnating the material with a solution of an iron chloride, which is of such a degree of alkalinity that the minimum amount of alkali only need be added to produce the precipitation of a mineral compound, and then bringing the impregnated material into contact with a re-acting agent to precipitate the mineral compound in and on the material.

5. Process of treating fibrous materials which consists in rendering a solution of a normal metallic salt sensitive in regard to its tendency to precipitate a mineral compound therefrom by the addition of an alkaline substance to an extent such that a slight excess will provide a permanent precipitate, impregnating the fibrous material with the sensitive solution and then precipitating a mineral compound from the solution in and on the material.

6. Process of treating fibrous materials which consists in rendering a solution of a normal metallic salt sensitive in regard to its tendency to precipitate a mineral compound therefrom by the addition of an alkaline substance to an extent such that a slight excess will provide a permanent precipitate, impregnating the fibrous material with the sensitive solution, and then bringing into contact the impregnated material with an alkaline substance, whereby a solid compound is precipitated in and on the material.

7. Process of treating fibrous materials which consists in rendering a solution of a normal metallic salt sensitive in regard to its tendency to precipitate a mineral compound therefrom by the addition of a carbonate to an extent such a slight excess will provide a permanent precipitate, impregnating the fibrous material with the sensitive solution, and then bringing into contact the impregnated material and a re-agent, whereby a solid compound is precipitated in and on the material.

In testimony whereof I affix my signature.

JAMES RANKIN GARROW.